(12) United States Patent
Fujita et al.

(10) Patent No.: US 8,192,858 B2
(45) Date of Patent: Jun. 5, 2012

(54) ELECTRODE PLATE FOR BATTERY AND METHOD AND APPARATUS FOR FORMING THE SAME

(75) Inventors: Hideaki Fujita, Osaka (JP); Yutaka Wakai, Aichi (JP)

(73) Assignee: Panasonic Corporation, Osaka (JP)

( * ) Notice: Subject to any disclaimer, the term of this patent is extended or adjusted under 35 U.S.C. 154(b) by 859 days.

(21) Appl. No.: 11/703,209

(22) Filed: Feb. 7, 2007

(65) Prior Publication Data
US 2007/0204458 A1  Sep. 6, 2007

(30) Foreign Application Priority Data
Feb. 7, 2006  (JP) .................................. 2006-029372

(51) Int. Cl.
*H01M 2/14*  (2006.01)
*H01M 4/02*  (2006.01)
*H01M 4/13*  (2010.01)

(52) U.S. Cl. ........ 429/139; 429/129; 429/209; 429/211; 429/246

(58) Field of Classification Search .................. 429/139, 429/179, 211; *H01M 2/16*
See application file for complete search history.

(56) References Cited

U.S. PATENT DOCUMENTS

| 5,705,292 A * | 1/1998 | Yukita et al. ................... 429/137 |
| 2004/0029014 A1* | 2/2004 | Hwang et al. ................... 429/246 |
| 2005/0221172 A1* | 10/2005 | Kato et al. ..................... 429/144 |

FOREIGN PATENT DOCUMENTS

| JP | 9-298058 | 11/1997 |
| JP | 3371301 | 11/2002 |
| JP | 2005-190912 | 7/2005 |
| JP | 2005190912 A | * 7/2005 |

* cited by examiner

*Primary Examiner* — Jerry Lorengo
*Assistant Examiner* — Jared Wood
(74) *Attorney, Agent, or Firm* — McDermott Will & Emery LLP (57) ABSTRACT

A method for forming an electrode plate for a battery includes the steps of (a) forming mixture layers on a current collector, lateral end surfaces of the mixture layers forming a continuous plane with at least one lateral end surface of the current collector; and (b) forming a porous film on the mixture layers. The step (b) includes the steps of: (b1) placing an electrode plate including the current collector and the mixture layers on a gravure roll having a cylindrical part and a truncated cone part provided continuously on an end surface of the cylindrical part to have an outwardly increasing inside diameter, the location of the end surface of the truncated cone part near the cylindrical part corresponding to the location of the continuous plane; and (b2) after the step (b1), abutting the gravure roll against the moving electrode plate while rotating the gravure roll in the opposite direction to the direction of travel of the electrode plate, thereby continuously applying a coating fluid serving as a precursor of the porous film to the electrode plate to cover longitudinal surfaces of the mixture layers and the continuous plane.

3 Claims, 4 Drawing Sheets

ELECTRODE PLATE FOR BATTERY AND METHOD AND APPARATUS FOR FORMING THE SAME

CROSS-REFERENCE TO RELATED APPLICATIONS

The disclosure of Japanese Patent Application No. 2006-029372 filed on Feb. 7, 2006 including specification, drawings and claims is incorporated herein by reference in its entirety.

BACKGROUND OF THE INVENTION (1) Field of the Invention

The present invention relates to electrode plates for batteries and methods for fabricating the same, and more particularly relates to electrode plates for batteries whose longitudinal surfaces and lateral end surface are covered with a continuous porous film and methods for fabricating the same.

(2) Description of Related Art

Primary batteries, such as dry batteries and lithium primary batteries, and secondary batteries, such as lead acid batteries, alkali storage batteries, and lithium secondary batteries, are now widely used for various applications including cell phones, notebook computers, digital cameras, electric power tools, and further hybrid vehicles. Under such circumstances, there have been demands for further increases in the capacity and power of such batteries.

Meanwhile, if an internal short circuit between a positive electrode and a negative electrode occurred inside a battery due to internal factors, such as the mixing of a foreign substance into the battery, or external factors, such as the generation of an external pressure, the increases in the capacity and power of the battery would cause a large current to flow into the short-circuited part of the battery, leading to heat generation of the battery or other problems.

In order to prevent the occurrence of the internal short circuit as described above, the following battery has been suggested (for example, Patent Document 1: Japanese Unexamined Patent Application Publication No. 7-220759). For a battery of a known example, a porous film containing a resin binder and solid particles, such as alumina powder, is formed to cover the longitudinal surfaces of any one of a positive electrode and a negative electrode. Methods for applying a coating fluid that will become a porous film to the longitudinal surfaces of an electrode plate include, for example, a gravure printing method (For example, Patent Document 2: Japanese Unexamined Patent Application Publication No. 9-298058).

By the way, in order to prevent an internal short circuit from being caused due to the separation of a porous film from an electrode plate or a crack in the porous film, a technique has been disclosed in which insulators are formed on the lateral end surfaces of an electrode plate group (for example, Patent Document 3: Japanese Unexamined Patent Application Publication No. 2005-190912). The insulators are formed in the following manner: After the preparation of the electrode plate group, the lateral end surfaces of the electrode plate group are soaked in a heated solution obtained by mixing 1000 grams of insulative particles made of alumina and 1000 grams of hot melt adhesive together, and then the soaked lateral end surfaces of the electrode plate group are cooled.

SUMMARY OF THE INVENTION

Factors of internal short circuits include not only the separation of a porous film and a crack in the porous film but also the following factors.

For batteries having an electrode plate group, for example, configured such that positive and negative plates are wound or stacked, burrs formed on the electrode plates by cutting the electrode plate may cause an internal short circuit between the so formed burrs and the lateral end surfaces of the electrode plates opposed to the so formed burrs.

In particular, for batteries having an electrode plate group configured such that tabless-type positive and negative plates are wound or stacked, any external pressure applied to the electrode plate group may cause a bend in a part of a positive electrode (or a negative electrode) at which a current collector foil is exposed. This bend may bring the current collector foil exposed part of the positive electrode (or the negative electrode) into contact with a lateral end surface of a negative-electrode (or positive-electrode) mixture layer and thus cause an internal short circuit between the positive-electrode (or negative-electrode) current collector and the negative-electrode (or positive-electrode) mixture layer.

Meanwhile, in a case where in order to prevent an internal short circuit from occurring, insulators are formed on the lateral end surfaces of an electrode plate by using the method disclosed in Patent Document 3, the following problems are caused.

After the step of forming porous films on the longitudinal surfaces of the electrode plate, the step of forming insulators on the lateral end surfaces of the positive electrode by soaking an electrode plate group in a solution is carried out. Therefore, these steps must be separately performed, resulting in methods for forming these films complicated.

The weight percent of a binder in a heated solution used for the formation of the insulators is high. Thus, the heated solution possesses a high viscosity. In order to adhere the solution to the top and bottom end surfaces of the electrode plate group by soaking the electrode plate group in the solution, a binder-rich (i.e., resin-rich) solution must be used as the solution in terms of the film formation method. In other words, even if a solution rich in insulative fine particles (i.e., a filler-rich solution) is used as the heated solution, the solution cannot be adhered to the lateral end surfaces of the electrode plate group by soaking the electrode plate group in the solution due to its low viscosity. For this reason, insulators formed on the lateral end surfaces of the electrode plate are limited to resin-rich insulators. This prevents filler-rich insulators from being able to be formed with high accuracy.

Since the lateral end surfaces of the electrode plate group are soaked in the heated solution, the influence of heat on the electrode plate group must be taken into account. Therefore, the structure of the electrode plate group is limited. More particularly, for the electrode plate group including a separator, the less refractory separator may cause problems due to heat. Therefore, the electrode plate group is limited to a separator-less electrode plate group. Since the electrode plate group is limited to the separator-less electrode plate group, the range of applications of the method is narrow.

In view of the above, an object of the present invention is to achieve, with ease and high accuracy, a filler-rich insulating film (more specifically, a porous film) continuously covering longitudinal surfaces and lateral end surfaces of an electrode plate without limitations on the structure of an electrode plate group.

In order to solve the above-mentioned problems, a method for forming an electrode plate for a battery according to the present invention includes the steps of: (a) forming mixture layers on a current collector, lateral end surfaces of the mixture layers forming a continuous plane with at least one lateral end surface of the current collector; and (b) forming a porous film on the mixture layers, the step (b) including the steps of:

(b1) placing an electrode plate including the current collector and the mixture layers on a gravure roll having a cylindrical part and a truncated cone part provided continuously on an end surface of the cylindrical part to have an outwardly increasing inside diameter, the location of the end surface of the truncated cone part near the cylindrical part corresponding to the location of the continuous plane; and (b2) after the step (b1), abutting the gravure roll against the moving electrode plate while rotating the gravure roll in the opposite direction to the direction of travel of the electrode plate, thereby continuously applying a coating fluid serving as a precursor of the porous film to the electrode plate to cover longitudinal surfaces of the mixture layers and the continuous plane.

According to the method of the present invention, a coating fluid can be applied onto the longitudinal surfaces of the mixture layers by the cylindrical part of the gravure roll including the cylindrical part and the truncated cone part and applied onto the continuous plane (i.e., one lateral end surface of the electrode plate) by the truncated cone part. This eliminates the need for performing the step of forming a porous film on the lateral end surface of the electrode plate and the step of forming a porous film on the longitudinal surfaces of the electrode plate separately as in the known art. In view of the above, the porous film can be continuously formed with ease and high accuracy to cover the longitudinal surfaces of the mixture layers and the continuous plane.

Furthermore, not only a resin-rich coating fluid but also a filler-rich coating fluid can be applied onto the continuous plane (i.e., the lateral end surface of the electrode plate) with high accuracy by the gravure roll having the truncated cone part. This allows a filler-rich insulating film (specifically, a porous film) to be formed on the lateral end surface of the electrode plate with high accuracy.

In the method of the present invention, the coating fluid preferably contains a filler and a binder, and the content of the filler in the coating fluid is preferably higher than that of the binder in the coating fluid.

In the method of the present invention, in the step (b2), the electrode plate is preferably moved while the location at which the electrode plate travels is adjusted based on information about the location of the electrode plate.

Thus, the relationship between the location at which the electrode plate travels and the location at which the gravure roll rotates can be accurately controlled by adjusting the location at which the electrode plate travels. Therefore, the coating fluid can be continuously applied to the electrode plate with ease and high accuracy to cover the longitudinal surfaces of the mixture layers and the continuous plane.

In the method of the present invention, in the step (b2), the gravure roll is preferably rotated while the location at which the gravure roll rotates is adjusted based on information about the location of the electrode plate.

Thus, the relationship between the location at which the electrode plate travels and the location at which the gravure roll rotates can be accurately controlled by adjusting the location at which the gravure roll rotates. Therefore, the coating fluid can be continuously applied to the electrode plate with ease and high accuracy to cover the longitudinal surfaces of the mixture layers and the continuous plane.

In order to solve the above-mentioned problems, an apparatus for forming an electrode plate for a battery according to the present invention includes: a coating fluid tank for storing a coating fluid serving as a precursor of a porous film; and a gravure roll placed to abut against an electrode plate and including a cylindrical part and a truncated cone part, said truncated cone part being provided continuously on an end surface of the cylindrical part and having an outwardly increasing inside diameter.

According to the apparatus of the present invention, the coating fluid stored in the coating fluid tank can be continuously applied to the electrode plate with ease and high accuracy by the gravure roll including the cylindrical part and the truncated cone part to cover the longitudinal surfaces of the mixture layers and the continuous plane (i.e., the lateral end surface of the electrode plate).

In the apparatus of the present invention, the angle between the side of the cylindrical part and the side of the truncated cone part is preferably between 90 and 160 degrees.

It is preferable that the apparatus of the present invention further includes a controller for controlling the relationship between the location at which the electrode plate travels and the location at which the gravure roll rotates.

In view of the above, contact between the continuous plane (i.e., the lateral end surface of the electrode plate) and the side of the truncated cone part of the gravure roll can be prevented with reliability.

In the apparatus of the present invention, the controller preferably includes a travel location detector for detecting the location at which the electrode plate travels and an electrode plate travel location adjuster for adjusting the location at which the electrode plate travels based on information about the location of the electrode plate from the travel location detector.

In the apparatus of the present invention, the controller preferably includes a travel location detector for detecting the location at which the electrode plate travels and a gravure roll rotation location adjuster for adjusting the location at which the gravure roll rotates based on information about the location of the electrode plate from the travel location detector.

In order to solve the above-mentioned problems, an electrode plate for a battery according to the present invention includes a current collector and mixture layers formed on the current collector, lateral end surfaces of the mixture layers forming a continuous plane with a lateral end surface of the current collector. In this electrode plate, a porous film continuously covering longitudinal surfaces of the mixture layers and the continuous plane.

According to the electrode plate of the present invention, the porous film can be continuously formed with high accuracy to cover the longitudinal surfaces of the mixture layers and the continuous plane (i.e., the lateral end surface of the electrode plate).

In the electrode plate of the present invention, the coating fluid preferably contains a filler and a binder, and the content of the filler in the coating fluid is preferably higher than that of the binder in the coating fluid.

Thus, a porous film in which a larger amount of filler than that of binder is contained is continuously formed with high accuracy to cover the longitudinal surfaces of the mixture layers and the continuous plane (i.e., the lateral end surface of the electrode plate).

In the electrode plate of the present invention, the lateral end surface of the current collector opposed to the continuous plane preferably extends beyond the lateral end surfaces of the mixture layers opposed to the continuous plane.

In order to solve the above-mentioned problems, an electrode plate group for a battery according to the present invention including a positive electrode and a negative electrode, said positive electrode including a positive-electrode current collector and positive-electrode mixture layers formed on the positive-electrode current collector, lateral end surfaces of the positive-electrode mixture layers forming a continuous plane with a lateral end surface of the positive-electrode current collector, said negative electrode including a negative-electrode current collector and negative-electrode mixture layers formed on the negative-electrode current collector, lateral end surfaces of the negative-electrode mixture layers forming a continuous plane with a lateral end surface of the negative-electrode current collector, said positive and negative electrode being stacked or wound with a separator interposed therebetween. At least one of the positive and negative electrodes further includes a porous film continuously covering longitudinal surfaces of the associated mixture layers and the associated continuous plane.

According to the electrode plate group of the present invention, a porous film is formed on the continuous plane (i.e., one lateral end surface of at least one of the positive and negative electrodes) with high accuracy. Even when burrs are produced on the electrode plate by cutting the electrode plate, an internal short circuit between the burrs and the lateral end surface of the electrode plate can be prevented with reliability. This can provide a safe battery.

More particularly, in the electrode plate group including a separator, a porous film is accurately formed on the lateral end surface of the electrode plate without causing problems on the separator due to heat, i.e., without limitations due to the structure of the electrode plate group for a battery as in the known art.

In the electrode plate group of the present invention, the lateral end surface of the positive-electrode current collector opposed to the associated continuous plane preferably extends beyond the lateral end surfaces of the positive-electrode mixture layers opposed to the associated continuous plane, and the lateral end surface of the negative-electrode current collector opposed to the associated continuous plane preferably extends beyond the lateral end surfaces of the negative-electrode mixture layers opposed to the associated continuous plane.

Thus, the porous film is accurately formed on the continuous plane (i.e., the lateral end surface of at least one of the positive and negative electrodes (more particularly, the lateral end surface of at least one of the positive and negative electrodes opposed to a part of the positive or negative electrode at which a current collector foil is exposed)). Therefore, even if the current collector foil exposed part of the positive (or negative) electrode is bent by a pressure applied to the current collector foil exposed part, the current collector foil exposed part is not in direct contact with the lateral end surfaces of the negative-electrode (or positive-electrode) mixture layers. This can prevent an internal short circuit between the positive-electrode (or negative-electrode) current collector and the negative-electrode (or positive-electrode) mixture layers with reliability. Therefore, a safe battery can be provided.

In the electrode plate group of the present invention, said at least one of the positive and negative electrodes is preferably the negative electrode, and it is preferable that the porous film continuously covers longitudinal surfaces of the negative-electrode mixture layers and the associated continuous plane.

In general, a positive electrode is an electrode for controlling capacity, and the negative electrode has a larger area than the positive electrode. Therefore, the probability of contact between the current collector foil exposed part of the positive electrode and the lateral end surfaces of the negative-electrode mixture layers is higher than that of contact between the current collector foil exposed part of the negative electrode and the lateral end surfaces of the positive-electrode mixture layers. In view of the above, if a porous layer is formed on a lateral end surface of the positive electrode but the negative electrode, the problems unique to the tabless structure can be effectively solved.

As described above, according to the method of the present invention, the coating fluid can be applied onto the longitudinal surfaces of the mixture layers by the cylindrical part of the gravure roll including the cylindrical part and the truncated cone part and applied onto the continuous plane (i.e., the lateral end surface of the electrode plate) by the truncated cone part. This eliminates the need for performing the step of forming a porous film on the lateral end surface of the electrode plate and the step of forming a porous film on the longitudinal surfaces of the electrode plate separately as in the known art. In view of the above, the porous film can be continuously formed with ease and high accuracy to cover the longitudinal surfaces of the mixture layers and the continuous plane.

Furthermore, not only a resin-rich coating fluid but also a filler-rich coating fluid can be applied onto the continuous plane (i.e., the lateral end surface of the electrode plate) with high accuracy by the gravure roll having the truncated cone part. This allows a filler-rich insulating film (specifically, a porous film) to be formed on the lateral end surface of the electrode plate with high accuracy.

In addition, according to the electrode plate group of the present invention, a porous film is formed on the continuous plane (i.e., the lateral end surface of at least one of the positive and negative electrodes) with high accuracy. This can prevent an internal short circuit on the lateral end surface of the electrode plate (more specifically, an internal short circuit between burrs produced by cutting the electrode plate and the lateral end surface of the electrode plate and an internal short circuit between the current collector and counter-electrode mixture layers) with reliability. Therefore, a safe battery can be provided.

DETAILED DESCRIPTION OF THE INVENTION

Embodiments of the present invention will be described hereinafter with reference to the drawings. In the following description, an electrode plate group configured such that tabless-type positive and negative plates are wound will be used as a specific example.

—Electrode Plate for Battery and Electrode Plate Group for Battery—

Figure 1A:
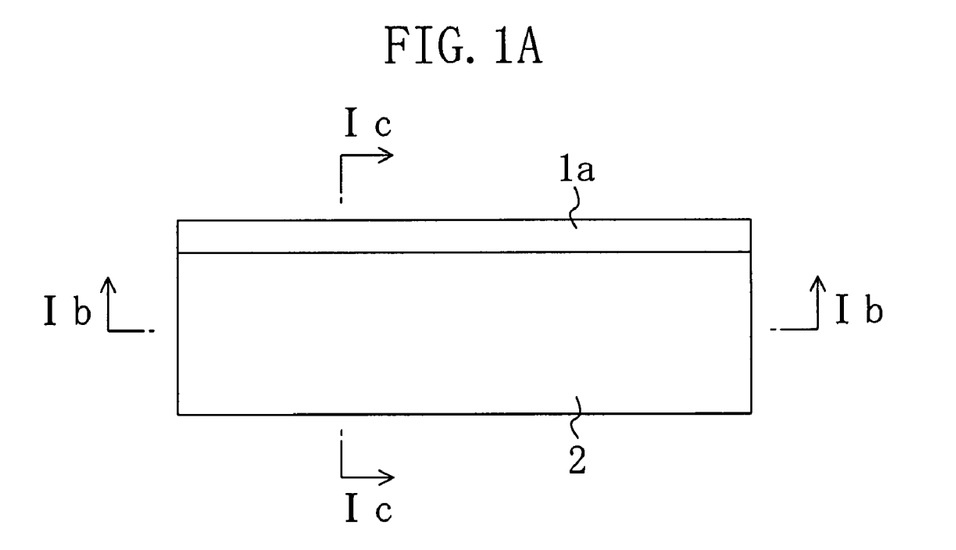
FIGS. 1(a) through 1(c) are diagrams illustrating the structure of a tabless-type electrode plate.
Figure 1B:
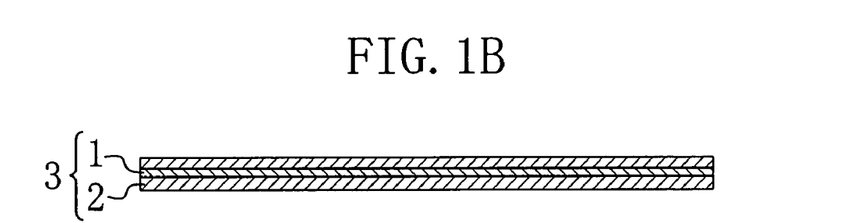
Figure 1C:
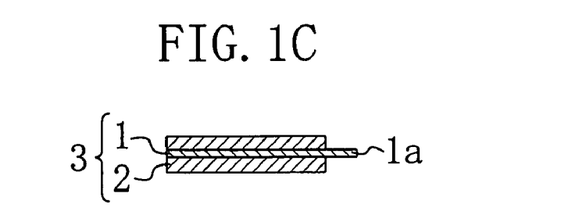

A tabless-type electrode plate will be briefly described hereinafter with reference to FIGS. 1(a) through 1(c). FIGS. 1(a) through 1(c) are diagrams illustrating the structure of a tabless-type electrode plate. FIG. 1(a) is a plan view illustrating the structure of the tabless-type electrode plate. FIGS. 1(b) and 1(c) are cross-sectional views illustrating the structure of the tabless-type electrode plate. More specifically, FIG. 1(b) is a cross-sectional view taken along the line Ib-Ib illustrated in FIG. 1(a), and FIG. 1(c) is a cross-sectional view taken along the line Ic-Ic illustrated in FIG. 1(a).

In particular, as illustrated in FIG. 1(c), a tabless-type electrode plate 3 includes a current collector 1 and mixture layers 2 formed on the top and bottom surfaces of the current collector 1 and is provided at any one of the lateral ends with a part 1a at which a current collector foil is exposed.

For the tabless-type electrode plate 3, the current collector 1 projects outward on one end to partially form the current collector foil exposed part 1a of the electrode plate. The opposing end surface of the current collector 1 and the opposing end surfaces of the mixture layers 2 form a continuous plane together.

In other words, the tabless-type electrode plate 3 is configured such that the lateral end surface of the current collector 1 opposed to the above-mentioned continuous plane extends beyond the lateral end surfaces of the mixture layers 2 opposed to the above-mentioned continuous plane.

Figure 2:
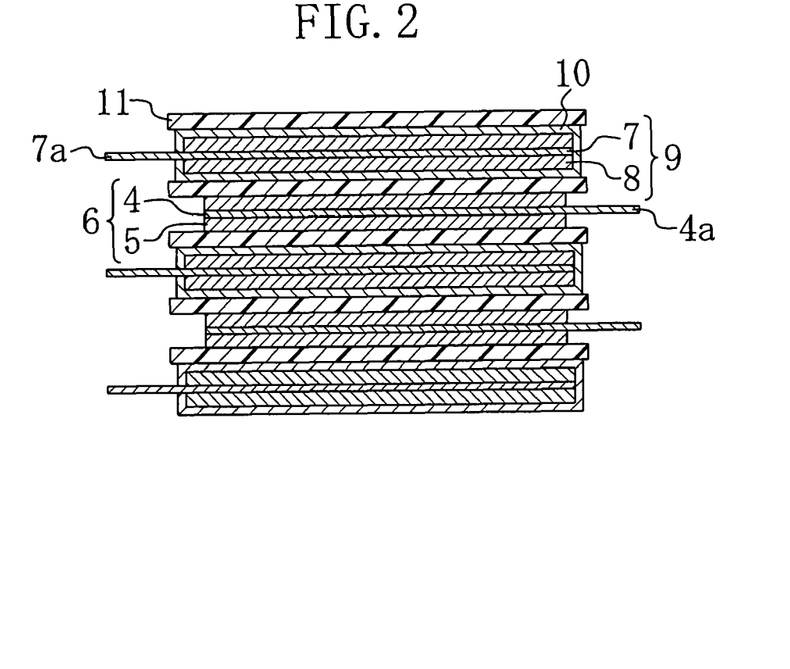
FIG. 2 is a cross-sectional view illustrating the structure of an electrode plate group for a battery according to the present invention.

An electrode plate group for a battery according to the present invention will be described hereinafter with reference to FIG. 2. FIG. 2 is a cross-sectional view illustrating the structure of the electrode plate group for the battery according to the present invention.

The electrode plate group for a battery illustrated in FIG. 2 is configured such that tabless-type positive electrodes 6, tabless-type negative electrodes 9, and separators 11 are wound. More particularly, each positive electrode 6 includes a positive-electrode current collector 4 made of, for example, aluminum foil and positive-electrode mixture layers 5 formed on the longitudinal surfaces of the positive-electrode current collector 4. Each negative electrode 9 includes a negative-electrode current collector 7 made of, for example, copper foil and negative-electrode mixture layers 8 formed on the longitudinal surfaces of the negative-electrode current collector 7.

As illustrated in FIG. 2, a porous film 10 is continuously formed to extend on parts of surfaces of the negative-electrode current collector 7 and the negative-electrode mixture layers 8 from the lateral end surface of the negative-electrode mixture layers 8 near the current collector foil exposed part 7a to the lateral end surface of the negative electrode 9 opposed to the current collector foil exposed part 7a. As described above, in the electrode plate group for a battery according to the present invention, the porous film 10 is continuously formed to cover the outer longitudinal surfaces of the negative-electrode mixture layers 8 and a continuous plane (formed by one lateral end surface of the negative-electrode current collector 7 and the associated lateral end surfaces of the negative-electrode mixture layers 8).

The porous film 10 contains a filler and a binder, and its thickness preferably falls within the range of, for example, 2 through 30 μm. Furthermore, the porous film 10 is preferably an insulative porous film from the viewpoints of safety and performance.

According to the electrode plate group for the battery of the present invention, even when burrs are formed on a negative electrode 9 by cutting the negative electrode 9, the burrs on the negative electrode 9 are not in direct contact with a lateral end surface of the electrode plate opposed to the burrs. The reason for this is that the porous film 10 is formed on the lateral end surface of the negative electrode 9 (more particularly, the continuous plane formed by the lateral end surface of the negative-electrode current collector 7 and the associated end surfaces of the negative-electrode mixture layers 8).

In view of the above, an internal short circuit can be prevented from occurring due to the burrs on the negative electrode.

In addition, according to the electrode plate group for a battery of the present invention, even when an external pressure applied to the current collector foil exposed part 4a of the positive electrode 6 causes a bend in the current collector foil exposed part 4a of the positive electrode 6, the current collector foil exposed part 4a of the positive electrode 6 is not in contact with the lateral end surfaces of the negative-electrode mixture layers 8. The reason for this is that the porous layer 10 covers the lateral end surfaces of the negative-electrode mixture layers 8. In view of the above, an internal short circuit can be prevented from occurring between the positive-electrode current collector 4 and the negative-electrode mixture layers 8.

In general, the positive electrode 6 is an electrode for controlling capacity, and the negative electrode 9 has a larger area than the positive electrode 6. Therefore, the probability of contact between the current collector foil exposed part 4a and lateral end surfaces of the negative-electrode mixture layers 8 due to a bend in the current collector foil exposed part 4a of the positive electrode 6 is higher than that of contact between the current collector foil exposed part 7a and lateral end surfaces of the positive-electrode mixture layers 5 due to a bend in the current collector foil exposed part 7a of the negative electrode 9. In view of the above, if a porous film 10 is formed on the lateral end surface of not the positive electrode 6 but the negative electrode 9 (more particularly, the continuous plane formed by the lateral end surface of the negative-electrode current collector 7 and the associated lateral end surfaces of the negative-electrode mixture layers 8) as illustrated in FIG. 2, the problems unique to the tabless-type electrode plate can be effectively solved.

—Apparatus for Forming Electrode Plate for Battery—

Figure 3:
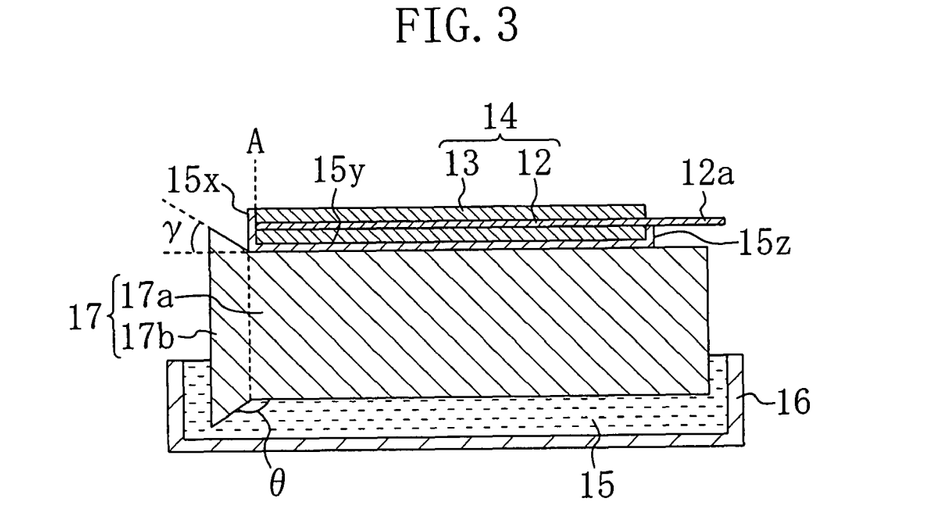
FIG. 3 is a cross-sectional view illustrating the structure of an apparatus for forming an electrode plate for a battery according to the present invention.
Figure 4:
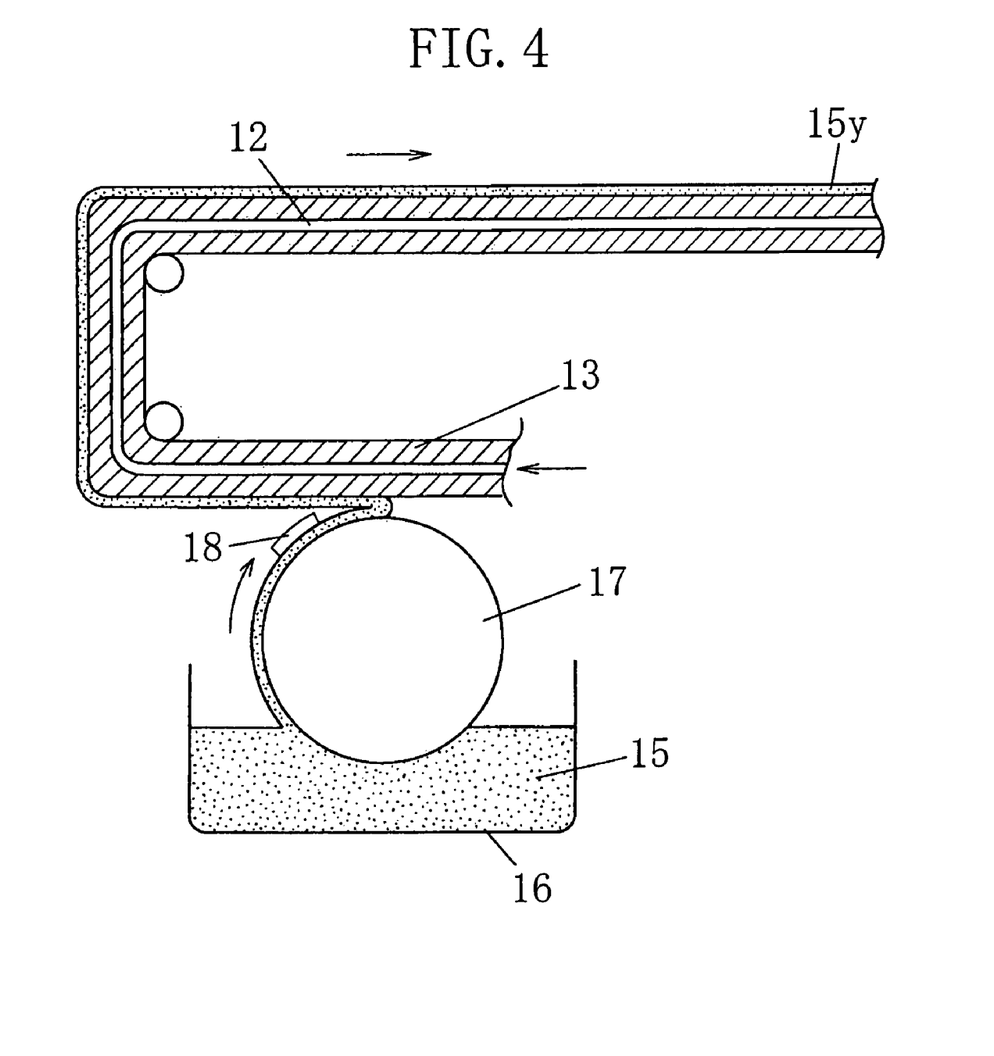
FIG. 4 is a cross-sectional view illustrating the structure of the apparatus for forming an electrode plate for a battery according to the present invention.

An apparatus for forming an electrode plate for a battery according to the present invention will be described hereinafter with reference to FIGS. 3 and 4. FIGS. 3 and 4 are cross-sectional views illustrating the structure of the apparatus for forming an electrode plate for a battery according to the present invention. To be specific, FIG. 3 is a cross-sectional view of a gravure roll when seen from one side thereof, and FIG. 4 is a cross-sectional view of the gravure roll when seen from one lateral end surface side thereof (more particularly, one lateral end surface side of a cylindrical part of the gravure roll).

As illustrated in FIGS. 3 and 4, the apparatus for forming an electrode plate for a battery of the present invention includes a coating fluid tank 16 in which a coating fluid (porous-film slurry) 15 serving as a precursor of a porous film is stored, a gravure roll 17 which is rotatably placed above the coating fluid tank 16 and whose entire circumferential surface is carved to form a gravure pattern, and a scraper blade 18 provided somewhere along the gravure roll 17 to scrape excess porous-film slurry on the gravure roll 17.

As illustrated in FIG. 3, the gravure roll 17 is composed of a cylindrical part 17a for applying porous-film slurry to an outer longitudinal surface of an electrode plate 14 by being brought into contact with the outer longitudinal surface of the electrode plate 14 and a truncated cone part 17b for applying porous-film slurry to a lateral end surface of the electrode plate 14 (more particularly, a continuous plane formed by a lateral end surface of a current collector 12 and the associated lateral end surfaces of mixture layers 13) by being brought into contact with the lateral end surface of the electrode plate 14.

The truncated cone part 17b is formed continuously with one lateral end surface of the cylindrical part 17a. The inside diameter of the truncated cone part 17b is set to increase outwardly. To be specific, the angle θ between the side of the cylindrical part 17a and the side of the truncated cone part 17b is set to satisfy the expression 90<θ<160.

According to the apparatus for forming an electrode plate for a battery of the present invention, the coating fluid 15 stored in the coating fluid tank 16 can be continuously applied to the electrode plate 14 with ease and high accuracy by the gravure roll 17 composed of the cylindrical part 17a and the truncated cone part 17b to cover the outer longitudinal surfaces of the mixture layers 13 and the lateral end surface of the electrode plate 14 (more particularly, the continuous plane formed by the lateral end surface of the current collector 12 and the associated lateral end surfaces of the mixture layers 13).

A pattern formed by carving the cylindrical part 17a forming part of the gravure roll 17 and the inside diameter of the cylindrical part 17a are not limited. Furthermore, the presence or absence of a pattern formed by carving the truncated cone part 17b forming the other part of the gravure roll 17 and the pattern are not particularly limited.

Figure 5:
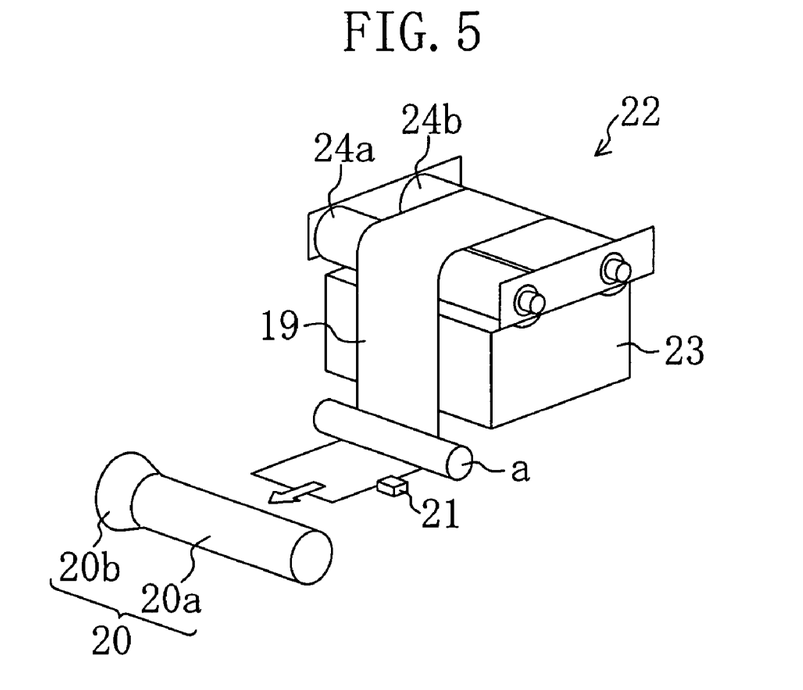
FIG. 5 is a perspective view schematically illustrating the structure of a controller.
Figure 6:
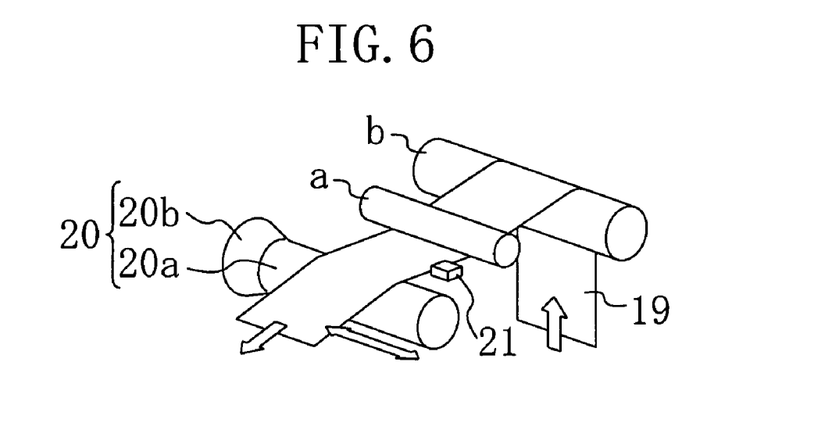
FIG. 6 is a perspective view schematically illustrating the structure of another controller.

Moreover, the apparatus for forming an electrode plate for a battery of the present invention preferably includes a controller for controlling the relationship between the location at which the electrode plate 14 travels and the location at which the gravure roll 17 rotates. Use of such a controller can certainly prevent a lateral end surface of the electrode plate 14 from being into contact with the side of the truncated cone part 17b of the gravure roll 17. Such controllers will be described with reference to FIGS. 5 and 6. FIGS. 5 and 6 are perspective views schematically illustrating the structures of controllers.

For example, as illustrated in FIG. 5, there is used a controller including a travel location detector (travel location sensor) 21 for detecting the location at which an electrode plate 19 travels and an electrode plate travel location adjuster (more specifically, e.g., roll guider) 22 for adjusting the location at which the electrode plate 19 travels based on information about the location of the electrode plate 19 from the travel location detector 21.

As illustrated in FIG. 5, the roll guider 22 includes a driver 23 and two rollers 24a and 24b placed on the driver 23. As illustrated in FIG. 5, the travel location sensor 21 is located on an end of the electrode plate 19 (more particularly, a lateral end thereof). In this figure, a guide roller a is illustrated to a side of the driver 23 (more particularly, the side of the electrode plate 19 to which the electrode plate 19 travels).

A description will be briefly given below of a method for adjusting the location at which the electrode plate 19 travels using the roll guider 22.

The location of the end of the traveling electrode plate 19 is sensed by the travel location sensor 21. The locations of the rollers 24a and 24b are fine-adjusted horizontally on the driver 23 depending on the amount of displacement of the sensed location. As a result, the electrode plate 19 is adjusted to travel through a predetermined location relative to the location at which a gravure roll 20 composed of a cylindrical part 20a and a truncated cone part 20b rotates.

For example, as illustrated in FIG. 6, there is used a controller including a travel location detector (travel location sensor) 21 for detecting the location at which an electrode plate 19 travels and a gravure roll rotation location adjuster (unshown) for adjusting the location at which a gravure roll 20 rotates based on information about the location of the electrode plate 19 from the travel location detector 21.

As illustrated in FIG. 6, the travel location sensor 21 is located on an end of the electrode plate 19 (more particularly, a lateral end thereof). In this figure, guide rollers a and b are illustrated.

A description will be briefly given below of a method for adjusting the location at which a gravure roll rotates using the gravure roll rotation location adjuster.

The location of the end of the moving electrode plate 19 is sensed by the travel location sensor 21. The location at which the gravure roll 20 rotates is fine-adjusted axially by the gravure roll rotation location adjuster depending on the amount of displacement of the sensed location. As a result, the gravure roll 20 is adjusted to rotate at a predetermined location relative to the location at which the electrode plate 19 travels.

—Method for Forming Electrode Plate for Battery—

A method for forming an electrode plate for a battery will be described hereinafter by using, as a specific example, a method for forming an electrode plate forming part of a lithium ion secondary battery.

Positive and negative plates forming part of a lithium ion secondary battery will be described as follows.

First, a positive electrode will be described hereinafter.

Active materials can include, for example, composite oxides, such as lithium cobalt oxide and its modifications (e.g., a eutectic of lithium cobalt oxide and aluminum or lithium cobalt oxide and magnesium), lithium nickel oxide and its modifications (substances obtained by replacing part of nickel in lithium nickel oxide with cobalt, aluminum or any other substance), and lithium manganese oxide and its modifications. For example, acetylene black, Ketjen black, or various graphites are used, as a conductive agent, alone or in combination. For example, polytetrafluoroethylene (PTFE), polyvinylidene fluoride (PVDF) or any other material is used as a binder.

A procedure by which a positive electrode is prepared is as follows. The above-mentioned materials are charged into a kneader, and a thickener is mixed with the charged materials as necessary. These materials are kneaded with water or an organic solvent, thereby preparing slurry that will be a mixture for a positive electrode. Thereafter, the slurry is applied onto a current collector foil made of, for example, aluminum foil by using a die coater or any other device and then dried, thereby forming mixture layers on the current collector foil. Then, the resultant object is pressed or slit as necessary, thereby processing the object to have a necessary size. In a case where a tabless-type positive electrode is prepared, at least one longitudinal end part of the positive electrode is formed with a non-coated part in which no positive-electrode mixture layer exists. In the above-mentioned procedure, a base material of the positive electrode is prepared.

Next, a negative electrode will be described hereinafter.

For example, various natural graphites, artificial graphites, an alloy composition, or any other material are used as an active material. For example, styrene-butadiene rubber (SBR), polyvinylidene fluoride (PVDF) or any other material is used as a binder.

A procedure by which a negative electrode is prepared is as follows. The above-mentioned materials are charged into a kneader, and a thickener is mixed with the charged materials as necessary. These materials are kneaded with water or an organic solvent, thereby preparing slurry that will be a mixture for a negative electrode. Thereafter, the slurry is applied onto a current collector foil made of, for example, copper foil by using a die coater or any other device and then dried, thereby forming mixture layers on the current collector foil. Then, the resultant object is pressed or slit as necessary, thereby processing the object to have a necessary size. In a case where a tabless-type negative electrode is prepared, at least one longitudinal end part of the negative electrode is formed with a non-coated part in which no negative-electrode mixture layer exists. In the above-mentioned procedure, a base material of the negative electrode is prepared.

A method in which a porous layer is formed on the above-described negative electrode by using an apparatus for forming an electrode plate for a battery according to the present invention will be described hereinafter with reference to FIGS. 3 and 4.

First, a filler and a binder are charged into a kneader and kneaded with a solvent, thereby preparing porous-film slurry.

An inorganic oxide typified by alumina, or the like is preferably used as the filler forming part of the porous-layer slurry. Heat resistance and electrochemical stability are demanded of the filler. The inorganic oxide or the like satisfies the demand. A gummous high polymer containing a non-crystalline, highly refractory and elastomeric polyacrylonitrile group are preferably used as the binder.

Thereafter, as illustrated in FIG. 3, the above-mentioned porous-film slurry 15 is stored in a coating fluid tank 16, and an electrode plate 14 is placed on a gravure roll 17 composed of a cylindrical part 17a and a truncated cone part 17b in the following manner: The location of the lateral end surface of the truncated cone part 17b located near the cylindrical part 17a corresponds to the location of one lateral end surface of the electrode plate 14 (more particularly, a continuous plane formed by a lateral end surface of a current collector 12 and the associated lateral end surfaces of mixture layers 13) (see the plane location A illustrated in FIG. 3).

Thereafter, as illustrated in FIG. 4, the gravure roll 17 is rotated in the opposite direction to the direction of movement of the electrode plate 14 while being allowed to abut against the moving electrode plate 14. In this way, porous-film slurries 15y and 15x are continuously applied to the electrode plate 14 to cover the outer longitudinal surfaces of the mixture layers 13 and one lateral end surface of the electrode plate 14 (more particularly, a continuous plane formed by a lateral end surface of the current collector 12 and the associated lateral end surfaces of mixture layers 13).

According to the method for forming an electrode plate for a battery of the present invention, a porous-film slurry 15y can be applied onto the outer longitudinal surfaces of mixture layers 13 by a cylindrical part 17a, and a porous-film slurry 15x can be applied onto a lateral end surface of an electrode plate 14 by a truncated cone part 17b. Thus, the porous-film slurries 15y and 15x can be continuously applied to the electrode plate 14 with ease and high accuracy to cover the outer longitudinal surfaces of the mixture layers 13 and a lateral end surface of the electrode plate 14 (more particularly, a continuous plane formed by a lateral end surface of a current collector 12 and the associated lateral end surfaces of mixture layers 13, i.e., the lateral end surface of the electrode plate 14 opposed to a current collector foil exposed part 12a of the electrode plate 14).

In the method of the present invention, the following case was described as a specific example: An electrode plate 14 is provided such that the location of a lateral end surface of the electrode plate 14 (more particularly, the lateral end surfaces of mixture layers 13 located near a current collector foil exposed part 12a) becomes closer to the middle of the electrode plate 14 than the location of the outer end surface of a cylindrical part 17a of a gravure roll 17. In this way, a porous-film slurry 15z is allowed to flow onto a lateral end surface of the electrode plate 14, i.e., the lateral end surface of one of the mixture layers 13 located near the current collector foil exposed part 12a. As a result, a porous film is formed also on the lateral end surfaces of the mixture layers 13 located near the current collector foil exposed part 12a with high accuracy.

In the present invention, an electrode plate group in which tabless-type positive and negative plates each formed with a current collector foil exposed part are wound was described as a specific example. However, the present invention is not restrictive. The present invention can be effectively applied also to, for example, an electrode plate group obtained by stacking positive and negative plates which do not have any part non-coated with mixtures (in other words, any current collector foil exposed part) and are formed entirely with mixture layers. The reason for this is that an internal short circuit between burrs formed by cutting an electrode plate and the lateral end surface of another electrode plate opposed to the burrs can be prevented.

In the present invention, an electrode plate group including a separator was described as a specific example. The present invention is not restrictive and can be effectively applied also to an electrode plate group taking on a separatorless structure.

A filler-rich insulating film of the present invention means an insulating film having a relatively low viscosity when in a coating fluid state and having a filler-to-binder weight % ratio of, for example, 10:1.

Examples of the present invention will be described hereinafter in detail.

Example 1

Preparation of Positive Electrode

A method for preparing a positive electrode will be described. Three kilograms of lithium cobalt oxide were kneaded with 100 grams of an aqueous PTFE dispersion solution manufactured by Daikin Industries, Ltd. (and having a solid content of 60%), 90 grams of acetylene black and the right amount of water in a planetary mixer, thereby preparing a positive-electrode slurry. This positive-electrode slurry was applied onto a 15-μm-thick and 150-nm-wide aluminum foil and dried. Thus, an 80-mm-wide electrode plate was formed at one of its lateral ends with a 10-mm-wide continuous non-coated part. The electrode plate was pressed to have a total thickness of 100 μm, and then the electrode plate was slit along the width of the electrode plate. As a result, a positive electrode was prepared in which an electrode plate has a width of 80 mm, a part of the electrode plate coated with a mixture has a width of 70 mm, and a non-coated part thereof has a width of 10 mm.

—Preparation of Porous Film—

First, a method for preparing a porous-film slurry will be described. 1000 grams of alumina having a median diameter of 0.3 μm were kneaded with 375 grams of the binder BM-720H (having a solid content of 8% by weight) of modified polyacrylonitrile rubber manufactured by Zeon Corporation, Japan, and the right amount of NMP in a planetary mixer, thereby preparing a porous-film slurry.

In this example, an apparatus for forming an electrode plate for a battery was used with a controller attached to the apparatus. More specifically, a travel location detector and an electrode plate travel location adjuster were attached to the apparatus for forming an electrode plate for a battery of the present invention. More particularly, a roll guider manufactured by Mitsuhashi Corporation and a travel location sensor were fixed to the apparatus including a gravure roll having a truncated cone part (see FIG. 5). The truncated cone part was set to have an inclination of 45 degrees (see the angle γ illustrated in FIG. 3) (in other words, the angle θ illustrated in FIG. 3 was set at 135 degrees).

The above-described positive electrode is placed on this apparatus, and a porous-film slurry was continuously applied to the positive electrode to cover the outer longitudinal surface of one of positive-electrode mixture layers and a continuous plane (more particularly, the continuous plane formed by a lateral end surface of a current collector and the associated lateral end surfaces of the above-mentioned positive-electrode mixture layers). Thereafter, a solvent of the porous-film slurry was dried in a dry oven constructed continuously with the apparatus. Thereafter, the positive electrode was turned upside down and again placed on this apparatus. Then, a porous-film slurry is continuously applied to the positive electrode to cover the outer longitudinal surface of the other one of the positive-electrode mixture layers and the continuous plane and then dried. In this way, a porous film is continuously formed to cover the outer longitudinal surfaces of the positive-electrode mixture layers and the continuous plane. This positive electrode is referred to as a positive electrode 1. The positive electrode 1 is an electrode plate to which a porous-film slurry was applied while the location at which the electrode plate travels was adjusted relative to the gravure roll.

Examples 2 Through 7

Positive electrodes were prepared like Example 1 except that gravure rolls of Examples 2, 3, 4, 5, 6, and 7 were set such that the inclinations of their truncated cone parts (see the angle γ illustrated in FIG. 3) were 5, 10, 20, 30, 70, and 90 degrees, respectively. These positive electrodes are referred to as positive electrodes 2 through 7.

Example 8

A gravure roll rotation location adjuster in FIG. 6 was used instead of the electrode plate travel location adjuster of Example 1. Thus, in this example, a porous-film slurry was applied to an electrode plate while the location at which a gravure roll rotates was adjusted relative to the electrode plate. A positive electrode was prepared like Example 1 except use of this adjuster. This positive electrode is referred to as a positive electrode 8.

Example 9

A positive electrode was prepared like Example 1 except that a controller of Example 1 was not used. This positive electrode is referred as a positive electrode 9.

Comparative Example 1

A positive electrode was prepared like Example 1 except use of a cylindrical gravure roll that does not have any truncated cone part. This positive electrode is referred to as a positive electrode 10.

Example 10

Preparation of Negative Electrode

First, a method for preparing a negative electrode will be described. Three kilograms of artificial graphite were kneaded with 75 grams of the binder BM-400B of styrene-butadiene copolymer rubber particles manufactured by Zeon corporation, Japan (and having a solid content of 40% by weight), 30 grams of carboxy methyl cellulose (CMC) and the right amount of water in a planetary mixer, thereby preparing a negative-electrode slurry. This negative-electrode slurry was applied onto a 10-μm-thick and 150-nm-wide copper foil and dried. Thus, an 85-mm-wide electrode plate was formed at one of its lateral ends with a 10-mm-wide continuous non-coated part. The electrode plate was pressed to have a total thickness of 170 μm, and then the electrode plate was slit along the width of the electrode plate. As a result, a negative electrode was prepared in which an electrode plate has a width of 80 mm, a part of the electrode plate coated with a mixture has a width of 75 mm, and an non-coated part thereof has a width of 10 mm.

—Preparation of Porous Film—

A porous film was prepared like Example 1 except use of not a positive electrode but a negative electrode as an electrode plate. A porous film was continuously formed to cover the outer longitudinal surfaces of negative-electrode mixture layers and a continuous plane. This negative electrode is referred to as a negative electrode 1.

Examples 11 Through 16

Negative electrodes were prepared like Example 10 except that gravure rolls of Examples 11, 12, 13, 14, 15, and 16 were set such that the inclinations of their truncated cone parts (see the angle γ illustrated in FIG. 3) were 5, 10, 20, 30, 70, and 90 degrees, respectively. These negative electrodes are referred to as negative electrodes 2 through 7.

Results obtained by visually checking the average thickness of a part of a porous film formed on a lateral end surface of each of the above-described electrode plates (more particularly, a continuous plane formed by a lateral end surface of a current collector and the associated lateral end surfaces of mixture layers) and the presence or absence of displacement of the location at which the electrode plate travels from a gravure roll when a porous-film slurry is applied to the electrode plate (more particularly, the difference between the location of the lateral end surface of a truncated cone part located near a cylindrical part and the location of the associated lateral end surface of the electrode plate) are illustrated in [Table 1] below.

TABLE 1

| Electrode plate | Inclination (degrees) | Controller | On-end-surface porous-film thickness (μm) | Displacement of location at which electrode plate travels |
|---|---|---|---|---|
| Positive electrode 1 | 45 | Roll guider | 4.9 | No |
| Positive electrode 2 | 5 | Roll guider | 0.7 | No |
| Positive electrode 3 | 10 | Roll guider | 1.4 | No |
| Positive electrode 4 | 20 | Roll guider | 2.6 | No |
| Positive electrode 5 | 30 | Roll guider | 3.4 | No |
| Positive electrode 6 | 70 | Roll guider | 5.6 | No |
| Positive electrode 7 | 90 | Roll guider | 7.1 | No |
| Positive electrode 8 | 45 | Gravure roll rotation location adjuster | 4.7 | No |
| Positive electrode 9 | 45 | None | 4.5 | Yes |

TABLE 1-continued

| Electrode plate | Inclination (degrees) | Controller | On-end-surface porous-film thickness (μm) | Displacement of location at which electrode plate travels |
|---|---|---|---|---|
| Positive electrode 10 | 0 | Roll guider | Film unformable | No |
| Negative electrode 1 | 45 | Roll guider | 4.0 | No |
| Negative electrode 2 | 5 | Roll guider | 0.5 | No |
| Negative electrode 3 | 10 | Roll guider | 1.1 | No |
| Negative electrode 4 | 20 | Roll guider | 2.3 | No |
| Negative electrode 5 | 30 | Roll guider | 3.1 | No |
| Negative electrode 6 | 70 | Roll guider | 4.6 | No |
| Negative electrode 7 | 90 | Roll guider | 5.9 | No |

In each of positive electrodes 1 through 9 and negative electrodes 1 through 7, part of a porous film was formed on the lateral end surface of the electrode plate opposed to a current collector foil exposed part thereof (in other words, a continuous plane formed by a lateral end surface of a current collector and the associated lateral end surfaces of mixture layers). The thickness of the part of the porous film formed on the lateral end surface of the electrode plate (hereinafter, simply referred to as "on-end-surface porous-film thickness") varied according to the inclination of the truncated cone part.

For each of the positive electrodes 2 and 3, i.e., when the inclination of the truncated cone part is less than 20 degrees, part of a porous film can be formed on the lateral end surface of the electrode plate. However, the on-end-surface porous-film thickness was slightly uneven. On the other hand, when the inclination of the truncated cone part is 20 degrees or more, the on-end-surface porous-film thickness did not vary and was even. Furthermore, for each of the positive electrodes 1, 6, 7, 8, and 9, i.e., when the inclination of the truncated cone part is 45 degrees or more, the on-end-surface porous-film thickness was 4 μm or more. In other words, a porous film was formed thick enough to certainly prevent an internal short circuit on burrs produced by cutting the electrode plate and an internal short circuit on the current collector foil exposed part.

Also for the negative electrodes 1 through 7, the results similar to those of the positive electrodes were provided.

For the positive electrode 9, i.e., under use of an apparatus for forming an electrode plate for a battery without a controller, part of a porous film can be formed on a lateral end surface of the electrode plate. However, since the apparatus does not include any controller, the difference between the location at which the electrode plate travels and the location of a gravure roll was recognized.

For a positive electrode 10, i.e., under use of a simply cylindrical gravure roll, a porous film can be formed on the outer longitudinal surfaces of mixture layers. However, no porous film was able to be applied onto the lateral end surface of the electrode plate opposed to a current collector foil exposed part thereof (in other words, a continuous plane formed by a lateral end surface of a current collector and the associated lateral end surfaces of the mixture layers). The reason for this is considered that a porous-film slurry was in contact with only the outer longitudinal surfaces of the mixture layers.

The following is seen from the above-mentioned results: If a gravure roll is composed of a cylindrical part and a truncated cone part which is formed continuously with at least one lateral end of the cylindrical part and whose inside diameter increases outwardly and further provided with a device for adjusting the location at which an electrode plate travels relative to the location at which the gravure roll rotates or a device for adjusting the location at which the gravure roll rotates relative to the location at which the electrode plate travels, part of a porous film can be formed on the lateral end surface of the electrode plate with higher accuracy.

The inclination of the truncated cone part (see the angle γ illustrated in FIG. 3) is preferably 20 through 90 degrees (in other words, the angle between the side of the cylindrical part and the side of the truncated cone part (see the angle θ illustrated in FIG. 3) is between 90 and 160 degrees). The inclination of the truncated cone part is more preferably 45 through 90 degrees. In view of the above, a porous film can be formed thick enough to prevent an internal short circuit on burrs produced by cutting the electrode plate and an internal short circuit on the current collector foil exposed part with reliability.

In a case where the present invention is applied to a tabless-type electrode plate and thus having a current collector foil exposed part, this provides not only the effect of preventing an internal short circuit on burrs produced by cutting the electrode plate but also the effect of preventing an internal short circuit between the current collector foil exposed part and counter-electrode mixture layers. In the present examples, a case where a porous film is formed to cover a lateral end surface of a tabless-type electrode plate was described as a specific example. However, the present invention is not restrictive.

For an electrode plate which does not have any part uncoated with a mixture (i.e., current collector foil exposed part) and on which mixture layers are entirely formed, a lateral end surface of the electrode plate has the same shape as the lateral end surface of a tabless-type electrode plate (however, for the tabless-type electrode plate, "the lateral end surface of the electrode plate" is limited to the lateral end surface thereof opposed to a current collector foil exposed part. On the other hand, for an electrode plate on which mixture layers are entirely formed, it includes both the lateral end surfaces of the electrode plate.). In view of the above, a porous film can be formed on a lateral end surface of an electrode plate with high accuracy. This can prevent an internal short circuit on burrs produced by cutting the electrode plate.

As described above, according to the present invention, a porous film can be continuously formed, with ease and high accuracy, to cover the longitudinal surfaces of an electrode plate for a battery and a lateral end surface thereof. This can prevent an internal short circuit on the lateral end surface of the electrode plate for a battery (more specifically, an internal short circuit on burrs produced by cutting the electrode plate and an internal short circuit on the current collector foil exposed part). Therefore, the present invention is useful for an electrode plate for a battery and a method for forming the same.

What is claimed is:

1. An electrode plate group for a lithium ion secondary battery, said electrode plate group comprising a positive electrode and a negative electrode, said positive electrode including a positive-electrode current collector and positive-electrode mixture layers formed on the positive-electrode current collector, lateral end surfaces of the positive-electrode mixture layers forming a continuous plane with a lateral end surface of the positive-electrode current collector, said negative electrode including a negative-electrode current collector and negative-electrode mixture layers formed on the negative-electrode current collector, lateral end surfaces of the negative-electrode mixture layers forming a continuous plane with a lateral end surface of the negative-electrode current collector, said positive and negative electrode being stacked or wound with a separator interposed therebetween,     wherein the negative electrode further includes a porous film continuously covering longitudinal surfaces of the negative-electrode mixture layers and the associated continuous plane,     the porous film is formed directly on the associated continuous plane,     the porous film contains a filler and a binder,     the content of the filler in the porous film is higher than that of the binder in the porous film,     a ratio of a weight of the filler to that of the binder is greater than or equal to 10, and     the porous film is provided separately from the separator and disposed between the negative-electrode mixture layer and the separator.

2. The electrode plate group of claim 1, wherein the lateral end surface of the positive-electrode current collector opposed to the associated continuous plane extends beyond the lateral end surfaces of the positive-electrode mixture layers opposed to the associated continuous plane, and the lateral end surface of the negative-electrode current collector opposed to the associated continuous plane extends beyond the lateral end surfaces of the negative-electrode mixture layers opposed to the associated continuous plane.

3. The electrode plate group of claim 2, wherein the porous film is formed to cover the associated continuous plane, the longitudinal surfaces of the negative-electrode mixture layers, and the lateral end surfaces of the negative-electrode mixture layers opposed to the associated continuous plane.

* * * * *